Figure 4:
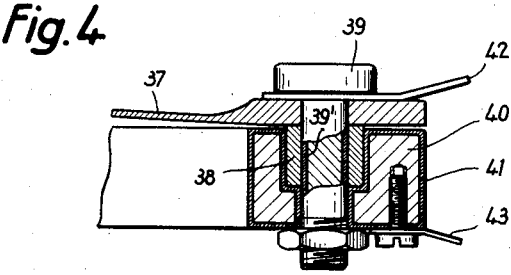

Sept. 1, 1959         K. SCHERER ET AL         2,901,936
DEVICE FOR THE CONVERSION OF MECHANICAL OSCILLATORY
ENERGY INTO ELECTRICAL OSCILLATORY ENERGY
Filed Feb. 16, 1955         4 Sheets-Sheet 1
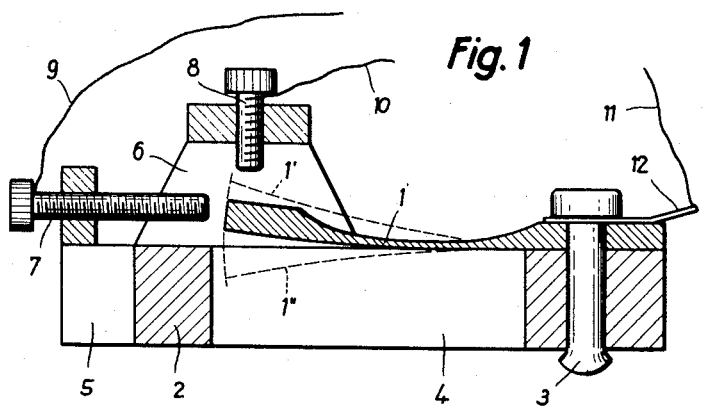
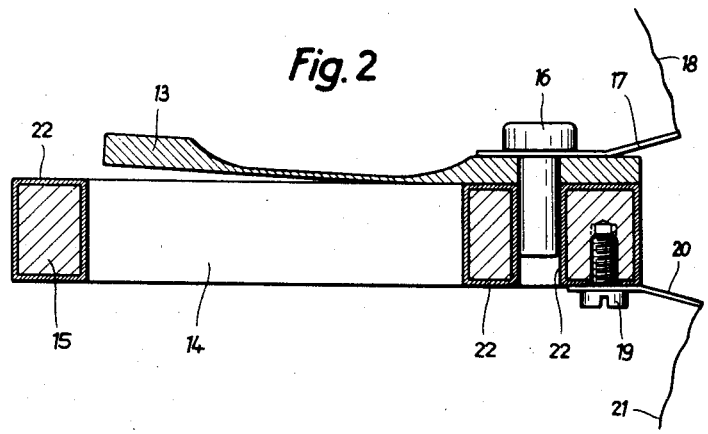
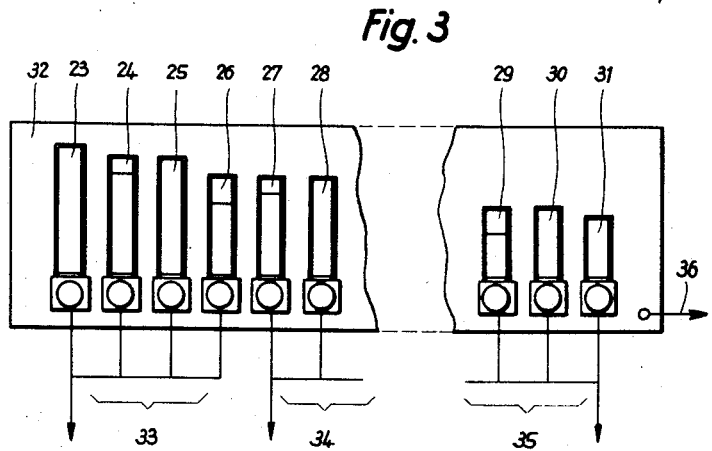
INVENTORS
KARL SCHERER
WILLY SAUER Sept. 1, 1959 K. SCHERER ET AL 2,901,936
DEVICE FOR THE CONVERSION OF MECHANICAL OSCILLATORY
ENERGY INTO ELECTRICAL OSCILLATORY ENERGY
Filed Feb. 16, 1955 4 Sheets-Sheet 2

INVENTORS:
KARL SCHERER
WILLY SAUER

INVENTORS:
KARL SCHERER
WILLY SAUER

Sept. 1, 1959 K. SCHERER ET AL 2,901,936
DEVICE FOR THE CONVERSION OF MECHANICAL OSCILLATORY
ENERGY INTO ELECTRICAL OSCILLATORY ENERGY
Filed Feb. 16, 1955 4 Sheets-Sheet 4
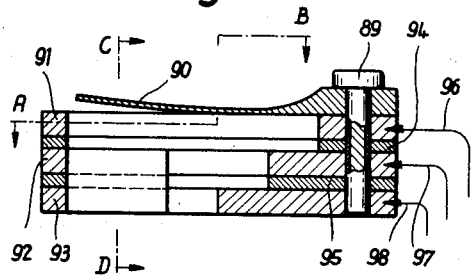
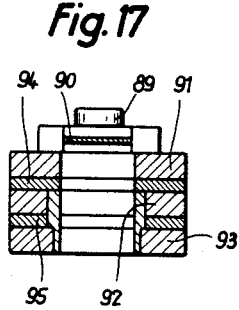
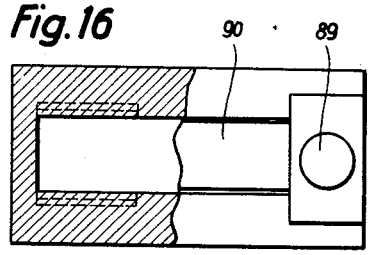
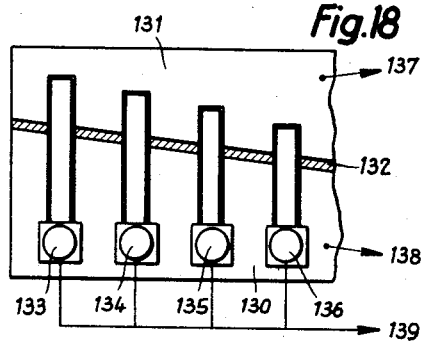
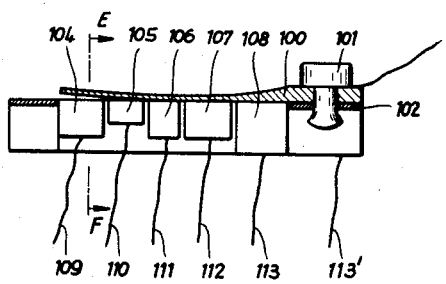
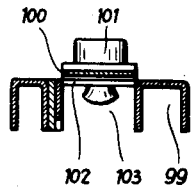
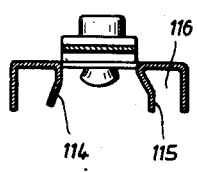
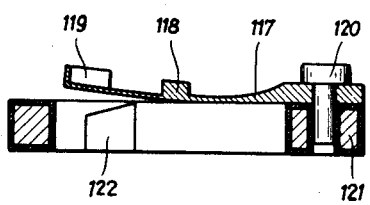
INVENTORS:
KARL SCHERER
WILLY SAUER

United States Patent Office 2,901,936
Patented Sept. 1, 1959

---

2,901,936

DEVICE FOR THE CONVERSION OF MECHANICAL OSCILLATORY ENERGY INTO ELECTRICAL OSCILLATORY ENERGY

Karl Scherer and Willy Sauer, Trossingen, Germany

Application February 16, 1955, Serial No. 488,668

Claims priority, application Germany February 16, 1954

3 Claims. (Cl. 84—1.04)

The development of electrical musical instruments has been progressing rapidly, as the fact has been recognized that it is possible, with the aid of such instruments, to exercise an extensive influence on the tonal qualities of the sounds produced. The provision of low-cost means serving to produce and to determine the desired characteristics of musical sounds will render it possible to make the use of electric musical instruments more popular.

The present invention has had its origin in the consideration that the extent to which the price of an electric musical instrument, even of one having a large number of notes, can be kept within reasonable limits will depend on the extent to which it can be made possible, without any major additional expenditure, to convert commercially available mechanical oscillating systems which are adapted to produce certain tonal frequencies into suitable converters which permit mechanical oscillatory energy to be transformed into electrical oscillatory energy. There have been available electro-mechanical converters of known construction, these being in the form of so-called microphones, but these converters are not adapted to fulfil the function of a converter according to the invention; moreover, the known converters of the type mentioned are exclusively used for the purposes of acoustical amplification. Since the use of the above-mentioned known devices introduces the danger of stray reaction or feedback effects, which effects can only be eliminated by the provision of sound-proof enclosures for the said devices, and since the provision of such enclosures necessitates relatively considerable expenditure, it is impossible to reduce the price of an instrument of the type hereinabove mentioned by using the known devices of the type indicated. Moreover, the commercially available microphones are inherently unsuitable as oscillation transformers or converters for musical instruments in which tonal frequencies are produced by electric means, since the general design of such microphones does not take into consideration their use for the purpose indicated.

The present invention provides a converter for the transformation of mechanical oscillations into electrical oscillations which is particularly suitable for electric musical instruments and which meets to a great extent the hereinbefore mentioned requirements; a converter according to the invention is constituted by a capacitor comprising at least one oscillatory electrode the oscillatory resistance of which is at least twenty times its radiation resistance, which latter is associated with the natural frequency of said electrode. This 20-to-1 ratio between the oscillatory resistance of said oscillatory electrode and the radiation resistance pertaining to the natural frequency of said electrode completely eliminates any stray reaction or feedback effects, in consequence whereof it is possible to dispense with sound-proof enclosures. In contrast to microphones, the converter of the invention will not transform any impulses produced by other sources of sound. In a specific embodiment of the invention in which the carrier member of an oscillatory electrode serves the function of the opposite electrode of the capacitor, a metallic string member or reed is provided in the form of an element of very simple construction. The device of the invention can be still further improved by insulating the oscillatory electrode from said carrier member by a non-conductive, preferably electrolytically deposited layer of a metallic compound. As has been known, such insulating layers can be easily produced and applied by electrolytical processes. While they are very durable, they have sufficiently high insulating properties.

According to the invention, however, the requirements in regard to converters for use with an electric musical instrument are met in a particularly satisfactory manner by providing for the said capacitor to be constituted by the reed carrier of a harmonium-like musical instrument. The reed of a harmonium is mounted on such a reed carrier in a well-known reliable manner so as to ensure satisfactory conditions under which mechanical vibrations can occur. Moreover, the electrodes of the capacitor are in this case available in a relative position such that no further adjustment is necessary, the said electrodes being constituted by the metallic reed or its electrically conductive surfaces on the one hand and by the said reed carrier on the other.

Figure 5:
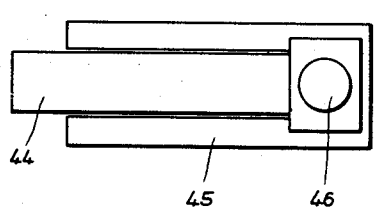
Figure 6:
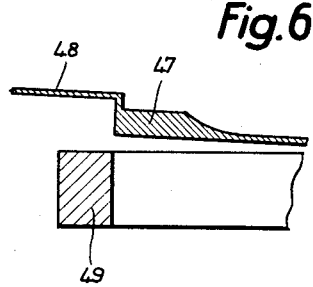
Figure 7:
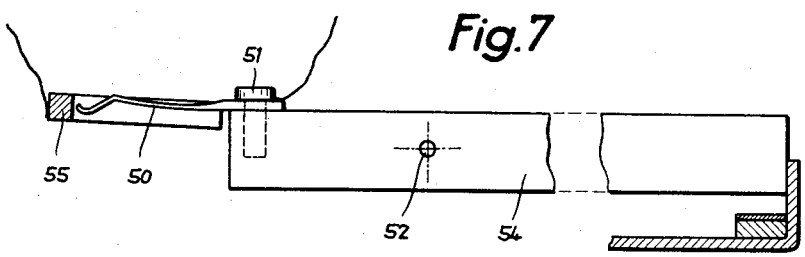
Figure 8:
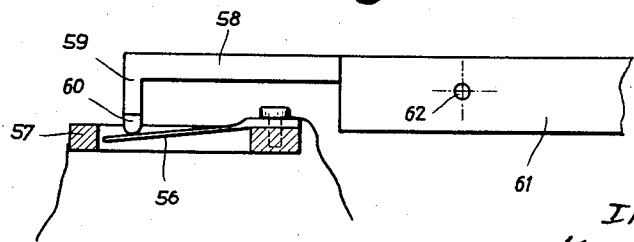

Further objects and features of the present invention will be apparent from the following description of certain preferred embodiments, reference being had to the appended drawings, in which: Fig. 1 is a longitudinal sectional elevation of a converter of known construction which serves to transform mechanical oscillatory energy into electrical oscillatory energy; Fig. 2 illustrates, also in longitudinal sectional elevation, an embodiment of the invention in which the capacitor is constituted, in the manner mentioned earlier, by the reed carrier of a harmonium-like musical instrument; Fig. 3 shows that the reed carrier, here shown in plan view, may comprise a carrier which is common to a plurality of reeds; Fig. 4 is similar to the righthand part of Fig. 2, but also illustrates an elastic supporting structure for the oscillatory electrode; Figs. 5 and 6, which respectively resemble the lefthand part of Fig. 2, illustrate two different embodiments of a reed carrier capacitor comprising an oscillatory electrode which extends beyond the respective opposite electrode; Figs. 7 and 8 are part-sectional elevations of embodiments of oscillatory electrodes which are formed as reeds, said reeds being either mounted on a separately supported playing key of a musical instrument (Fig. 7) or which are, at the beginning of their vibration, moved by an actuating member, for example by a key, into a desired half-way position (Fig. 8) which is necessary for the maintenance of the oscillations excited by an air stream; Figs. 9 to 14 are wiring diagrams and illustrative frequency charts, respectively, of embodiments of circuits in which the converter of the invention may be used, these figures also being illustrative of the mode of operation of said converter; Figs. 15 to 17 respectively are front, end and plan views of an embodiment of a converter of the invention in which at least one of the capacitor electrodes has a plurality of zones of different field intensity and/or capacity in its direction of vibration; Fig. 18 is a plan view of another embodiment in which the opposite electrode is electrically subdivided transversely of the direction of oscillation of the reed; Figs. 19, 20 and 21 are longitudinal and transverse sectional views, respectively, of still further embodiments of reed carrier converters serving similar purposes to those of the embodiments of Figs. 15 and 17; and Fig. 22 illustrates still another embodiment in which the oscillatory electrode is provided with zones which pass the midway position at different times, i.e. in which there is different phase relationship for points along the axis of the reed.

In the known reed carrier converter of Fig. 1 the reed 1 is attached by means of a rivet 3 to a carrier member 2 which acts as a reed carrier. With the reed 1 in its rest position, the under side of the reed which faces the reed carrier is positioned in known manner, for example as indicated in Fig. 1, a slight distance above the upper edge of a slot 4 in the reed carrier, i.e. above that end of the said slot which is nearest the said reed. Under the action of a downwardly directed air stream, the reed 1 will be caused to oscillate in relation to the slot 4, these oscillations causing the reed 1 alternatingly to reach the positions indicated in Fig. 1 by the chain lines 1' and 1''.

Supported from the reed carrier 2 by insulating blocks 5 and 6 are two adjustable electrodes 7 and 8, respectively, which electrodes are in the form of screw-threaded members so that their respective distances from the reed 1 can be varied. Attached to said electrodes 7 and 8 are the connecting leads 9 and 10. The respective other lead 11 is attached to the soldering flag or terminal 12 which, together with the reed 1, is pressed against the reed carrier 2 by the head of the rivet 3, the result of this arrangement being that the parts 1, 2, 3 and 12 are electrically connected with one another.

The converter of Fig. 1 operates in a known manner, i.e. while the reed 1 is vibrating, any two of the leads 9 to 11 are connected in a bias-carrying circuit in which the electrical oscillatory energy is generated. The pattern of this oscillatory energy depends on the respective adjustment of the two threaded members or electrodes 7 and 8 and the circuit arrangement used.

However, the known reed carrier converter of Fig. 1 has certain inherent disadvantages in that it is necessary to provide the electrode members 7 and 8 and the insulating blocks 5 and 6 serving to support them, and, particularly, that the positions of said electrode members in relation to the free end of the reed 1 have to be accurately adjusted. In a multi-tone insrtument, in which it may be necessary to provide up to several hundred converters of the type described, the performance of this adjustment is an exceedingly tedious and time-consuming task. Furthermore, it is necessary in the case of such instruments to consider the possibility that within a certain amplitude range the reed may strike the opposite electrode.

Fig. 2 shows an embodiment of a reed carrier converter according to the invention which comprises a reed 13 which is adapted to oscillate in relation to a slot 14 provided in the reed carrier 15. In the case of this embodiment the reed 13 is adjusted in relation to the reed carrier slot in a manner which is common practice with musical instruments of the harmonium type. In the present case, this adjustment ensures not only a satisfactory operation of the converter from a mechanical point of view but also from an electrical point of view. The use of the reed 13 for electrical purposes is made possible by the lead 18 which is connected to a soldering terminal 17 which is in turn held in contact with the reed 13 by a peg 16 whose head presses the reed, together with the terminal 17, against the reed carrier plate 15, and by the lead 21 which is attached to another soldering terminal 20 which is in turn connected to the reed carrier 15 by a screw 19. The peg 16 may be a press fit in a suitable bore in the reed carrier or it may be secured by means of a suitable cement. The reed carrier plate 15 is surrounded by a non-conductive, preferably electrolytically deposited or formed layer 22, which may, for example, consist of aluminum oxide, this layer forming an insulation between the reed 13, i.e. the oscillatory electrode, and the peg or rivet 16 on the one hand and the reed carrier plate 15 on the other. Any insulation defects in the non-conductive layer 22 may, if necessary, be rendered harmless by the provision of a varnish coat and/or insulating material on the peg 16 and the reed 13. Extending through the insulating layer 22 is a screw 19 through which the respective potential is taken from the reed carrier 15.

Thus, the arrangement of Fig. 2 is an embodiment of a converter serving to transform mechanical oscillatory energy into electrical oscillatory energy, this converter being particularly adapted for use with electric musical instruments constitutes a capacitor which comprises an oscillatory electrode 13 and a co-operating electrode 15. As has already been mentioned, the said two electrodes are insulated from one another by the non-conducting layer 22. Since the circuit to which the leads 18 and 21 are connected serves to generate electrical oscillatory energy, which energy may, under certain circumstances, be fed to an amplifier the output of which is connected to a loudspeaker situated in the same room, it would per se be possible that a stray reaction or feedback effect is set up between the sonic vibrations produced by the membrane of the speaker and the oscillatory system constituted by the reed 13. However, since the oscillatory resistance of said reed, i.e. the ½-power of the quotient of mass and elasticity, amounts to at least twenty times the radiation resistance, i.e. the quotient of the sonic power emitted and the square of the velocity of sound, pertaining to the natural frequency of the reed 13, it will be impossible up to high power amplification ratios for the oscillatory electrode 13 to be subjected to such feedback effects.

Fig. 3 illustrates an arrangement in which the reeds 23 to 31 have a reed carrier 32 in common. In this case it is not necessary to subject all of the reeds 23 to 31 to the action of separate air streams conducted through enclosed passages containing the reeds and leading to an air pump, but only a few of said reeds may be directly exposed to an air stream or air streams, whereas other reeds may be caused by mass coupling effects to vibrate together with those exposed to the action of moving air.

It is possible with the arrangement of Fig. 3 to apply to the grouped connections 33 to 35 D.C. or high-frequency bias voltages of different magnitudes. The other electrode connection is indicated by the reference numeral 36.

In another embodiment, part of which is shown in sectional elevation in Fig. 4, the oscillatory electrode 37, which is in the form of a reed, is supported by a sleeve member 38 made of a suitable elastic material, the reed or electrode being pressed against the supporting sleeve by a screw 39. The sleeve member 38 is located by a bore in the reed carrier plate 40 which latter constitutes the opposite electrode in relation to the electrode 37 from which the former is insulated by a non-conductive layer 41. The retaining screw 39 is also covered with an insulating layer 39'. The lead conections 42 and 43 are constructed in a manner similar to that illustrated in Fig. 2.

The use of the sleeve member 38 of elastic material as a support for the oscillatory electrode 37 in the arrangement of Fig. 4 results in a greater damping decrement of the oscillatory system. A similar effect may be obtained by forming the reed 37 of a metal having a loss coefficient which is greater than that of steel. It is preferred for this purpose to use aluminum as a material for the reed 37; the reed 37 may also be made of a suitable non-conducting elastic material which is coated with metal. In arrangements in which both the oscillatory electrode and the opposite electrode are elastically supported and in which said electrodes are made of a material causing internal losses, non-linear oscillatory characteristics of the system may be accepted to a certain extent. In certain cases such characteristics which may, for example, result in the pitch of the tone being dependent on the amplitude, may be additionally provided by the use of an oscillatory electrode having a non-linear spring and/or damping constant.

Fig. 5 shows another embodiment of a converter according to the invention in which the oscillatory electrode 44 extends beyond the opposite electrode 45 to which it is attached by means of a rivet 46. In this case the yoke member 45 only partially surrounds the reed 44, the yoke member being open at that end which is nearest the free end of the reed 44. Reeds of this type, which extend beyond their associated opposite electrode may be excited in known manner by a plucking action.

Fig. 6 illustrates part of still another embodiment in which a reed 47 is provided with a projection 48, vibrations of said reed in relation to its opposite electrode 49 being excited by a plucking action or by the impingement thereon of an air stream.

Oscillations such as those produced by plucking the reeds 44 and 47 may be produced in the case of the above-described reed carrier converters by using a hammer to strike, for example, a portion of the reed 13 of Fig. 2 that is located near the supported end of said reed.

In the embodiment of Fig 7 the reed 50 the axis of which is non-rectilinear is attached by means of a rivet 51 to a key 54 which can be rocked about the fulcrum 52. It will be seen that this reed, in contrast to the one shown in Fig. 2, is no longer supported by its opposite electrode 55. The reed 50 may be excited to vibrate by applying a suitable force impulse-fashion to the key 54.

In the case of the converter of Fig. 7 the reed may be actuated in a similar manner, which is per se known, by providing, for example on the opposite electrode 55, a lug past which the free end of the reed 50 is caused to slide whenever the key 54 is operated, the reed 50 being simultaneously subjected to a bending action. The said lug, which is not shown in Fig. 7, may be replaced by a magnetic escapement.

The converter of Fig. 8 which, in similarity to the embodiment of Fig. 2, comprises a reed 56 and an associated opposite electrode 57, is arranged to be operated by a stream of air. Fig. 8 shows that in the rest position of the arrangement the reed 56 is pre-loaded by a finger 59, which may be provided with an elastic tip member 60, said finger 59 depending from an extension 58 attached to the key 61. Upon the reed 56 being relieved of its pre-load by the key 61 being rocked about its fulcrum 62, the reed will be caused to vibrate, these vibrations then being maintained by the air stream, the reed vibrating about its normal central position. It will be understood that this action of removing the pre-load from the reed will accelerate the initiation of reed vibrations.

With all of the above-described embodiments the oscillatory electrode is capable of vibrating with a greater or smaller amplitude, depending on operating conditions, i.e. depending, for example, on the magnitude of the mechanical excitation which is produced by a gas stream or by temporary contact with a suitable exciting force applicator. As long as the amplitude of reed vibration is small in comparison to the distance between the oscillatory electrode in its rest position from the opposite electrode, the resulting changes in capacity will be approximately proportional to the changes in elongation. However, if this range of proportionality is exceeded, i.e. if the respective operating conditions cause the amplitude of the reed vibrations to be increased in relation to the distance between the electrodes in the rest position of the arrangement, there will result functions of a higher order between the changes in capacity and the changes in elongation, this condition in turn resulting in the production of electrical oscillations comprising a greater or smaller number of upper harmonics. Where it is intended to utilise this effect to influence the amount of distortion, it is necessary, in order to avoid undesirable changes in volume, simultaneously to change the bias voltage in a corresponding manner.

The above-described relationship between the changes in capacity and the changes in elongation gains an even greater importance in cases in which the construction of a converter of the type suitable for this application permits the oscillatory electrode to plunge into or even through its opposite electrode. In these cases, i.e. whenever the oscillatory electrode enters or leaves the opposite electrode, there will occur nearly discontinuous changes in capacity. This will result in an even greater increase in the degree of distortion or the proportion of upper harmonics, these effects being governed by the selection of operating conditions, if desired in combination with the magnitude of the respective bias voltage and the thickness of the opposite stationary electrode.

In musical instruments it is frequently desired to produce a tremolo effect, this effect being due to an amplitude-modulated audio frequency. This effect can be produced by a converter according to the invention by periodically changing the bias voltage applied to the capacitor. Where a D.C. voltage is used as a bias voltage, these changes are brought about by periodically changing the magnitude of the D.C. voltage. Where the capacitor is biased by means of a high-frequency A.C. voltage, this voltage may be either amplitude-modulated or frequency-modulated.

Figure 9:
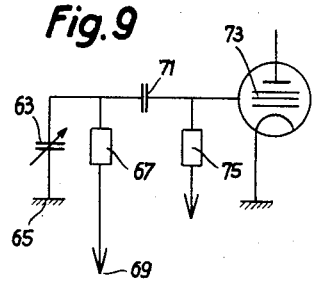
Figure 10:
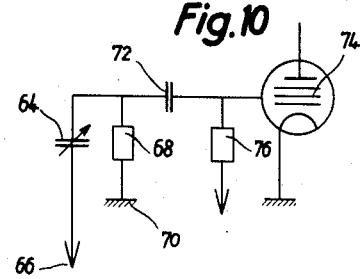

Figs. 9 and 10 show illustrative embodiments of circuits in which the capacitor 63 or the converter 64 of the invention is used, the converters 63 and 64 in these cases being biased by a D.C. voltage. In these circuits, one electrode of the capacitors 63 and 64 is grounded as indicated at 65 or connected, respectively, as indicated at 66, to a source of electric potential (not shown). The respective other electrode of the capacitor 63 or 64 is connected in series with a resistor 67 or 68 and either the potential 69 of a bias voltage source (not shown) or a ground connection, respectively. The resistors 67 and 68 ensure up to the lower limiting frequency of the resistance-capacitance networks constituted by said resistors and the capacitors 63 and 64, respectively, the maintenance of the charges of the capacitors 63 and 64 during the continuously occurring changes in capacity, so that these changes in capacity result in the desired changes in the pattern of alternating voltages, i.e. that said alternating voltages undergo changes with the frequency of the vibration of the oscillatory electrodes. If the bias voltage is additionally subjected to variations in the manner already described, i.e. by connecting a battery in series with a source of A.C. voltage, there will occur at the capacitors 63 or 64 those alternating voltages which have been mentioned earlier in connection with the tremolo effect. The constant or rhythmically varying A.C. voltages obtained in the manner just described are applied through the capacitors 71 or 72 to the grids of the electronic vacuum tubes 73 or 74. The resistors 75 and 76 serve as grid leak resistors. The vacuum tubes 73 and 74 may be connected either directly to the amplifier stages and the loud speakers or there may be provided additional distorting elements of known construction.

Figure 11:
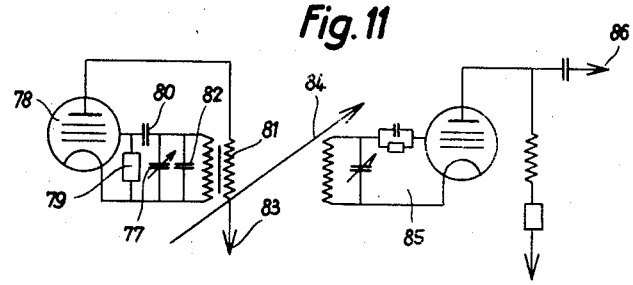
Figure 12:
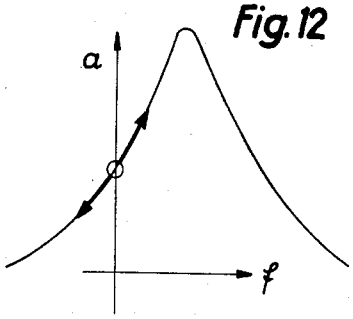

Fig. 11 illustrates a circuit arrangement which produces a modulated high frequency bias voltage for the capacitor 77 which is constituted by a converter according to the invention. In this arrangement the tube 78, together with the amplitude-limiting resistance-capacitance network constituted by the resistor 79 and the capacitor 80, and together with the transducer-transformer 81 and the constant capacitor 82, acts as a high-frequency generator. This generator first impresses upon the electrodes of the capacitor 77 a non-modulated high-frequency voltage. It is possible, by using periodical variations of the potential 83 of a battery (not shown), to give this high-frequency voltage an amplitude modulation or a frequency modulation, this being, as has already been mentioned, a prerequisite to the achievement of a tremolo effect.

This voltage of the high frequency generator 78 to 83 which has been modulated several times in the manner indicated, is coupled to the high frequency demodulator 85 as indicated by the arrow 84; at the output 86 of said demodulator there will thus re-appear the A.C. voltage of varying amplitude, which voltage, in similarity to the arrangements discussed in connection with Figs. 9 and 10, is applied, if desired through the medium of a distorting element, to an amplifier the output of which is connected to a loud speaker. In order to obtain the desired mode of operation of the demodulator 85, it is necessary to tune the resonant circuit of the demodulator to the frequency of the generator 78 to 83, this being indicated in Fig. 12.

Figure 13:
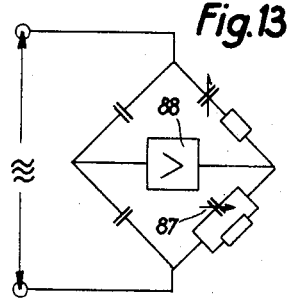
Figure 14:
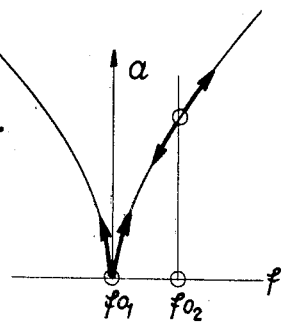

The demodulator 85 of Fig. 11 may be substituted for by a frequency-controlled bridge circuit such as illustrated in Fig. 13, this bridge circuit being coupled to the high frequency generator 78 to 83. Connected in one leg of this bridge circuit is the converter capacitor 87, whereas in the free diagonal of the bridge circuit there is connected a circuit 88 which comprises a rectifier, a distorting element, an amplifier and the loud speaker. The bridge circuit of Fig. 13 affords an advantage over the demodulator of Fig. 11 in that it is possible additionally to adjust the degree of distortion by selecting the tuning in accordance with the chart of Fig. 14.

The principle, shown in Fig. 13, of inserting a converter for the transformation of mechanical oscillatory energy into electrical oscillatory energy into a leg of a frequency-controlled bridge circuit of which one diagonal is fed with a high-frequency voltage and of which the other diagonal yields an output voltage which is introduced into a rectifier, also constitutes a feature of the present invention, this feature being of importance in regard to electric musical instruments independently of the use of a capacitive converter. Thus it is possible to substitute for the capacitor 87 in the circuit arrangement of Fig. 13 an inductance the field of which is influenced by an oscillating armature. In this case it is necessary to provide another inductance in at least one further leg of the bridge circuit of Fig. 13.

Fig. 15 is a longitudinal sectional elevation of a specific embodiment of a converter capacitor according to the invention which may be used in the circuit arrangements of Figs. 9, 10, 11 and 13. Fig. 16 is a part-sectional plan view taken along the line A—B in Fig. 15. Fig. 17 is a transverse section of the capacitor taken along the line C—D in Fig. 15.

With the aid of an insulated rivet 89 the oscillatory electrode 90 is again mounted on the stationary opposite electrode. This opposite electrode has zones of different capacity in the direction of vibration of the electrode 90. This is achieved by subdividing the opposite electrode into three metallic layers 91, 92 and 93 which are insulated from one another by intermediate insulating layers 94 and 95. The said zones of different capacity are in the present case formed by the provision of slots of different lengths in the individual zones. Zones of different field strength are provided by applying different bias voltages to the supply leads 96 to 98. The insulating layers 94 and 95 may be formed by depositing, preferably by electrolytic means, non-conductive layers of a metal compound on the metallic layers 91, 92, 93.

It will further be seen in Figs. 16 and 17 that zones of different capacity may also be formed by providing for different widths of the zone slots. From Fig. 16 it is evident that the said differences in width need not necessarily be provided over the entire longitudinal dimension of the capacitor.

The measures just described, which are intended to furnish zones of different capacity, are reflected in different widths of the slots. Where the oscillatory electrode 90 is to be acted upon by a fluid medium, these slots of different widths may exert a detrimental effect as regards the mechanical excitation of the electrode or reed 90. In order to eliminate such effects, the joints between the slots may be filled with insulating material in a manner which is determined by the smallest slot opening, this method resulting in the provision of a slot having the same shape as that of the embodiment shown in Fig. 2.

The measures serving to produce zones of different field strength and/or capacity in the direction of vibration of the oscillatory electrode as described in connection with Figs. 15 to 17 need not be used simultaneously. Thus, it is also possible, depending on the desired effects on the formation of tones, that either one or the other of these two methods may be used.

Fig. 18 illustrates a modified embodiment in which the opposite electrode is electrically subdivided perpendicularly to the directions of vibration of the oscillatory electrodes 133 to 136 into the portions 130 and 131, this arrangement providing for additional possibilities of connecting the converters. The two portions 130 and 131 are connected together by the insulating member 132. Depending on which two of the three leads 137, 138, 139 are connected in the biased circuit, oscillations following completely different patterns are obtained. A particularly simple form of a converter according to the invention in which oscillatory electrodes are arranged both singly and in groups is obtained by mounting the oscillatory electrodes 133 to 136 on the portion 130 of the opposite electrode in a heretofore known manner, whereby said electrodes are in electric contact with said portion of the opposite electrode. In this case the converter is connected by means of the leads 137 and 138.

The influence exerted on the formation of tones in the manner described in connection with Figs. 15 to 17 may also be exerted, as shown in Figs. 19 to 21, by means of yoke members provided for the opposite electrode, these yoke members being in the form of sheet-metal drawings. Fig. 19 is a longitudinal sectional elevation of such an embodiment, Fig. 20 showing a transverse section along the line E—F in Fig. 19. From Fig. 20 there will be seen the inverted twin-channel configuration of the yoke member 99. The reed 100 is mounted, by means of a rivet 101, on a transverse portion 102 of the yoke member, which portion has remained unaffected by the pressing operation. In the region of the slot 103 in the yoke member 99, in which slot the vibrating reed 100 operates, the inner wall of said slot is formed by a plurality of lugs, i.e. by portions 104 to 108 of different widths in the longitudinal direction of the slot and of different depths in the direction of vibration of the reed, these lugs or portions being insulated from one another and connected to different bias voltages by means of the leads 109 to 113.

Instead of using the lugs 104 to 108 of different widths and/or depths, it is possible to bend individual portions of the inner walls 114 and 115 of the yoke member in a different manner, this being illustrated in Fig. 21 for the yoke member 116. In the latter case, the bias voltages are applied in the manner indicated in Fig. 18.

However, zones of different field strength and/or capacity cannot only be provided by opposite electrodes of the forms shown in Figs. 15 to 21, but can also be provided by designing the oscillatory electrode in a suitable manner. Fig. 22 shows an example in which the oscillatory electrode 117 comprises a reed of special configuration in longitudinal section. Different methods are available by which to impart to the said reed the desired profile. In the embodiment of Fig. 22 the abutment 118 and the lug 119 on the free end of the reed are provided for this purpose. Reeds having such a profile or a similar profile comprise zones which will pass the central position at different times; in other words, there are differences in phase of the various portions of the reed. The oscillatory electrode 117 is mounted in the manner described earlier, i.e. by means of a rivet 120 which presses said electrode against the opposite electrode 121. The latter has formed therein a notch 122 in order to provide, also in the opposite electrode, an additional zone of different field strength and/or capacity.

As regards the filling of the slot joints, the same applies for the embodiments of Figs. 19 to 22 that has been explained in this respect in connection with the embodiments of Figs. 15 to 17. Using suitable insulating filler members it is thus possible in the case of yoke members in the form of sheet-metal drawings or in the form of solid members with a notch formed therein to give the reed carrier plate slot a configuration that will ensure proper operation of the oscillatory electrode under the action of the fluid medium.

In similarity to the hereinbefore mentioned use of pluralities of converters of the known type illustrated in Fig. 1 in musical instruments capable of producing numerous notes or tones, it is of course possible to use in such instruments any desired number of converters according to the invention. In this way there may be constructed single- or multiple-keyboard electrical instruments in which groups of such converters are associated with control keys, the said converters producing, if desired, different pitches and tone patterns. The groups of converters thus connected may be combined by mechanical or electric means. In such arrangements, all converters released by the switching means controlling said groups of converters may either be caused to oscillate or to produce electrical oscillations in a desired manner, this being done either by mechanical means (flap valve) or by electrical means (bias voltage), these mechanical or electrical control means being dependent for their mode of operation on the manner in which the keys of the instrument are actuated. The amplitude proportions furnished by the various groups of converters may also be determined in a known manner by suitable selection of the mechanical excitation (air stream) or of the electric bias voltage. The volume may be controlled in a similar manner.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A converter for transforming mechanical oscillatory energy into electrical oscillatory energy, especially for use with electric musical instruments; comprising a plurality of separate stationary carrier electrodes, an oscillatory electrode free at one end and fixed at another end to said carrier electrodes, said oscillatory electrode extending transversely to said carrier electrodes for oscillation relative thereto with said free end out of contact therewith in the rest position of said oscillatory electrode, said carrier electrodes being provided at the junction between the same and said oscillatory electrode with a coating of electrically non-conductive material insulating said oscillatory electrode from said carrier electrodes, whereby the latter and said oscillatory electrode constitute a variable multiple capacitor, said multiple capacitor being constructed to present a plurality of individual different capacitances in the direction of oscillation of said oscillatory electrode, said carrier electrodes comprising a plurality of electrically conductive plate members connected to and insulated from one another, each of said plate members having slots therethrough, said slots being of different sizes, said oscillatory electrode being fixed to one of said plate members and vibrating into said slots.

2. A converter according to claim 1, said oscillatory electrode being made of an electrically non-conductive, elastic material provided with a coating of electrically conductive metal.

3. A converter according to claim 1, said plate members being provided with recesses communicating with said slots and adjacent the path of oscillation of said oscillatory electrode and defining said zones of different capacitance, said recesses being filled with insulating material.

References Cited in the file of this patent

UNITED STATES PATENTS

| 477,661 | Janes | June 28, 1892 |
| 2,180,122 | Severy | Nov. 14, 1939 |
| 2,220,350 | Purington | Nov. 5, 1940 |
| 2,237,105 | Miessner | Apr. 1, 1941 |
| 2,273,975 | Miessner | Feb. 24, 1942 |
| 2,318,936 | Fisher | May 11, 1943 |
| 2,368,842 | Kealoha | Feb. 6, 1945 |
| 2,414,886 | Miessner | Jan. 28, 1947 |
| 2,656,755 | Miessner | Oct. 27, 1953 |

FOREIGN PATENTS

| 434,421 | Great Britain | Aug. 27, 1935 |